(12) United States Patent
Kubo (10) Patent No.: US 8,194,346 B2
(45) Date of Patent: Jun. 5, 2012

(54) DISK DRIVE HOUSING WITH RIBBED COVER

(75) Inventor: Yoichi Kubo, Ome (JP)

(73) Assignee: Kabushiki Kaisha Toshiba (JP)

( * ) Notice: Subject to any disclaimer, the term of this patent is extended or adjusted under 35 U.S.C. 154(b) by 55 days.

(21) Appl. No.: 12/831,959

(22) Filed: Jul. 7, 2010

(65) Prior Publication Data
US 2011/0007419 A1    Jan. 13, 2011

(30) Foreign Application Priority Data
Jul. 7, 2009 (JP) .................... 2009-160978

(51) Int. Cl.
*G11B 17/02* (2006.01)
(52) U.S. Cl. .................................. 360/97.19
(58) Field of Classification Search ............. 360/97.01, 360/97.02, 97.03, 97.19
See application file for complete search history.

(56) References Cited

U.S. PATENT DOCUMENTS

| | | | | |
|---|---|---|---|---|
| 5,282,100 A * | 1/1994 | Tacklind et al. | ............ | 360/97.02 |
| 5,596,461 A * | 1/1997 | Stefansky | ............ | 360/97.01 |
| 6,011,670 A * | 1/2000 | Balsley et al. | ............ | 360/97.01 |
| 6,023,392 A * | 2/2000 | Kim | ............ | 360/97.01 |
| 6,088,190 A * | 7/2000 | Anderson | ............ | 360/97.02 |
| 6,351,344 B1 * | 2/2002 | Krum et al. | ............ | 360/97.01 |
| 6,690,540 B2 * | 2/2004 | Hirasaka et al. | ............ | 360/97.02 |
| 6,721,128 B1 * | 4/2004 | Koizumi et al. | ............ | 360/97.02 |
| 6,757,131 B1 * | 6/2004 | Iwahara et al. | ............ | 360/97.01 |
| 6,894,866 B2 * | 5/2005 | Nishijima et al. | ............ | 360/97.02 |
| 6,922,308 B1 * | 7/2005 | Butler | ............ | 360/97.02 |
| 6,947,252 B2 * | 9/2005 | Kang et al. | ............ | 360/97.02 |
| 7,167,338 B2 * | 1/2007 | Iwahara et al. | ............ | 360/99.08 |
| 7,206,165 B2 * | 4/2007 | Lee | ............ | 360/97.01 |
| D542,790 S * | 5/2007 | Saruta | ............ | D14/363 |
| 7,256,959 B2 * | 8/2007 | Morioka | ............ | 360/97.01 |
| 7,787,212 B2 * | 8/2010 | Haynes et al. | ............ | 360/97.02 |
| 7,903,369 B1 * | 3/2011 | Codilian et al. | ............ | 360/97.02 |
| 2006/0268451 A1 * | 11/2006 | Kikuchi | ............ | 360/97.01 |

(Continued)

FOREIGN PATENT DOCUMENTS

JP      08-106773 A      4/1996

(Continued)

OTHER PUBLICATIONS

Notice of Reasons for Rejection mailed by Japan Patent Office on Sep. 14, 2010 in the corresponding Japanese Patent Application No. 2009-160978.

*Primary Examiner* — Brian Miller
(74) *Attorney, Agent, or Firm* — Knobbe, Martens, Olson & Bear LLP (57) ABSTRACT

According to one embodiment, a disk drive includes a housing comprising a base and a top cover combined to the base. The housing contains a motor configured to rotate about a rotational center and a pivot as a rotational center of a head actuator. The top cover includes a first rib. The first rib is configured in a shape comprising a first center in a triangular region. The triangular region has vertexes on a first point corresponding to the rotational center of the motor, a second point corresponding to the pivot, and a third point at a central portion of one side on an opposite side of the second point with respect to an axis extending longitudinally relative to the housing through the first point.

9 Claims, 6 Drawing Sheets

U.S. PATENT DOCUMENTS

| | | | |
|---|---|---|---|
| 2007/0002489 A1* | 1/2007 | Abe | 360/97.01 |
| 2011/0007419 A1* | 1/2011 | Kubo | 360/97.01 |

FOREIGN PATENT DOCUMENTS

| | | |
|---|---|---|
| JP | 2002-343071 A | 11/2002 |
| JP | 3493750 | 11/2003 |
| JP | 2004-005783 A | 1/2004 |
| JP | 2004-046964 | 2/2004 |
| JP | 2004-046964 A | 2/2004 |
| JP | 2006-331545 | 12/2006 |
| JP | 2006-331545 A | 12/2006 |
| JP | 2007-265470 A | 10/2007 |

* cited by examiner

DISK DRIVE HOUSING WITH RIBBED COVER

CROSS-REFERENCE TO RELATED APPLICATIONS

This application is based upon and claims the benefit of priority from Japanese Patent Application No. 2009-160978, filed Jul. 7, 2009; the entire contents of which are incorporated herein by reference.

FIELD

Embodiments described herein relate generally to a disk drive comprising a disk for use as a recording medium.

BACKGROUND

In recent years, disk drives, such as magnetic disk drives, optical disc drives, etc., have become widely used as external recording devices of computers or image or music recording/reproducing apparatuses.

A hard disk drive (HDD), for example, generally comprises a magnetic disk, spindle motor, head actuator, voice coil motor, circuit board unit, etc. The spindle motor supports and rotates the disk disposed in a housing. The head actuator supports a magnetic head. The voice coil motor drives the head actuator.

The housing comprises an open-topped base mounted with a plurality of mechanisms and a top cover that closes the opening of the base. The top cover is attached to the peripheral edge portion of the top surface of the base by screws. A bearing portion of the head actuator comprises a pivot, which stands on the base with its distal end attached to the top cover by a screw. Thus, the pivot is doubly supported in the housing.

In the magnetic disk drive constructed in this manner, vibration is produced as the spindle motor and magnetic disk rotate, the head actuator is caused to vibrate by an air current attributable to the disk rotation, and vibration is produced by a seek operation of the head actuator. Vibrations of the spindle motor and head actuator, as vibrating elements, are transmitted to the plate-like top cover through the base, the pivot of the head actuator, etc. Thus, the top cover vibrates and produces noise.

Accordingly, an apparatus is proposed in which the top cover is formed with ribs or constrictions for improved mechanical strength. In an apparatus described in Jpn. Pat. Appln. KOKAI Publication No. 2004-46964, for example, the top cover is formed with arcuate ribs or constrictions concentric with a disk. In another apparatus described in Jpn. Pat. Appln. KOKAI Publication No. 2006-331545, an opening is formed in that part of the top cover which is located just above yokes.

Modern information processing apparatuses, however, are required to be smaller and thinner, so that there is an increasing demand for thinner magnetic disk drives to be used in these apparatuses. Therefore, the top cover of the disk drives may be too thin to be sufficiently rigid. Further, secondary vibration, as well as primary vibration, of the top cover may cause a noise problem.

BRIEF DESCRIPTION OF THE DRAWING

A general architecture that implements the various feature of the invention will now be described with reference to the drawings. The drawings and the associated descriptions are provided to illustrate embodiments and not to limit the scope of the invention.

DETAILED DESCRIPTION

Various embodiments will be described hereinafter with reference to the accompanying drawings. In general, according to one embodiment, a disk drive comprises: a housing; a drive section configured to drive a disk recording medium located in the housing; and a head actuator configured to support a head. A wall portion of the housing comprises a first rib formed into a circular arc having a first center and a second rib formed into another circular arc having a second center different from the first center.

A hard disk drive (HDD) according to a first embodiment will now be described in detail with reference to the accompanying drawings.

Figure 1:
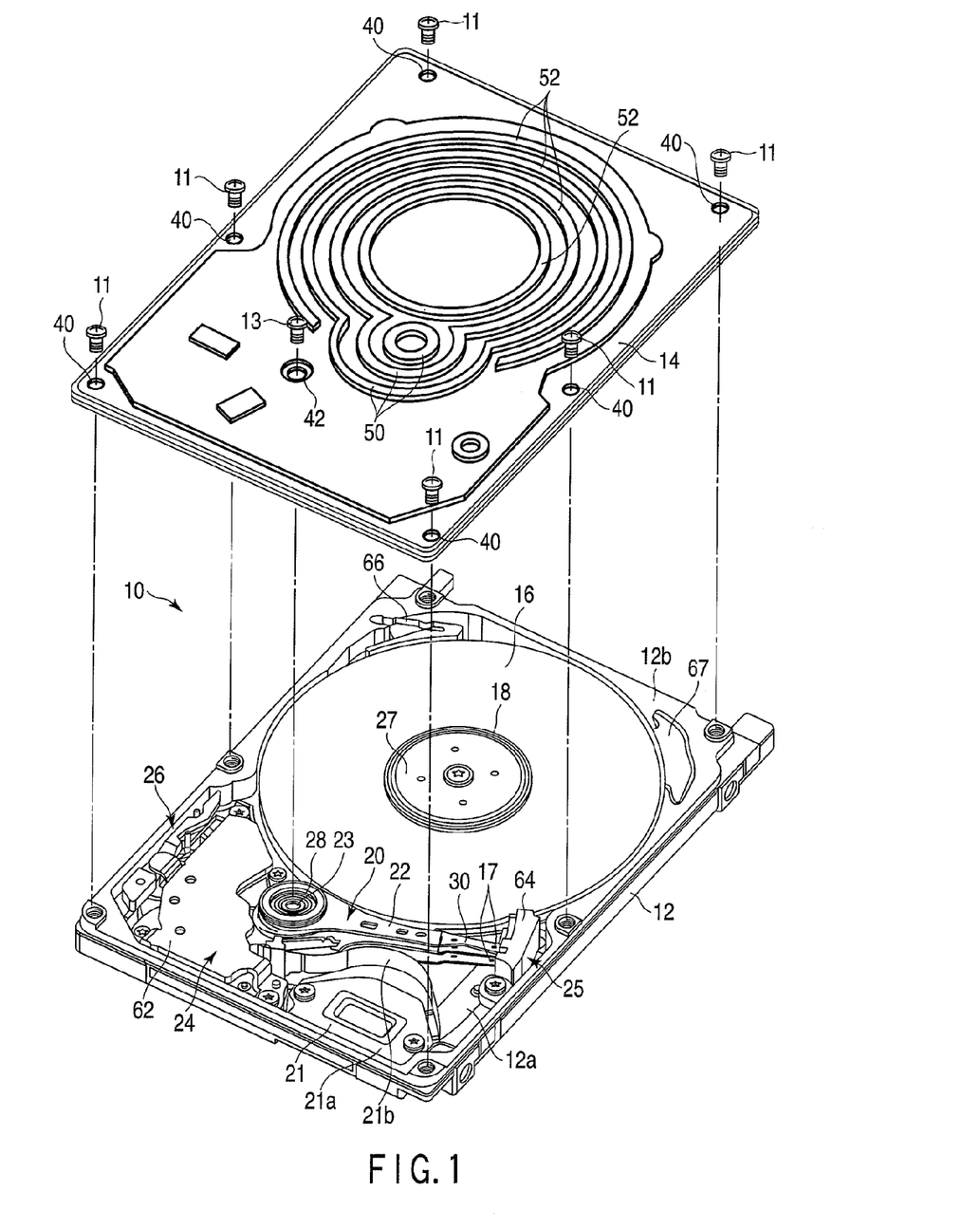
FIG. 1 is an exemplary exploded perspective view showing an HDD according to a first embodiment.

As shown in FIG. 1, the HDD comprises a sealed, flat rectangular housing 10. The housing 10 comprises a base 12 in the form of a rectangular box with a top opening and a top cover 14 in the form of a rectangular plate. The top cover 14 is fastened to the base 12 by screws 11 so as to close the top opening of the base.

The base 12 contains therein two magnetic disks 16 for use as recording media, spindle motor 18, magnetic heads 17, head actuator 20, and voice coil motor (VCM) 24. The spindle motor 18 supports and rotates the disks 16. The heads 17 record and reproduce information to and from the disks 16. The head actuator 20 supports the heads 17 for movement relative to the disks 16. The VCM 24 rotates and positions the head actuator 20. Further, the base 12 contains therein a ramp load mechanism 25, inertia latch mechanism 26, and flexible printed circuit board unit (FPC unit) 21. The ramp load mechanism 25 holds the magnetic heads 17 in a position at a distance from the magnetic disks 16 when the heads 17 are moved to the outermost peripheries of the disks. The inertia latch mechanism 26 holds the head actuator 20 in a retracted position if the HDD is jolted, for example. Electronic components, such as a preamplifier, are mounted on the FPC unit 21.

A printed circuit board (not shown) is attached to the outer surface of the base 12 by screws so as to be opposed to a bottom wall of the base 12. The printed circuit board controls the operations of the spindle motor 18, VCM 24, and magnetic heads 17 through the FPC unit 21.

Each magnetic disk 16 is formed with a diameter of, for example, 65 mm (2.5 inches) and comprises magnetic recording layers on its upper and lower surfaces, individually. The magnetic disks 16 are coaxially fitted on a hub (not shown) of the spindle motor 18, clamped by a clamp spring 21, and fixed to the hub. The disks 16 are rotated at a predetermined speed by the spindle motor 18 for use as a drive section.

The head actuator 20 comprises a bearing assembly 28, which is fixed on the bottom wall of the base 12. The bearing assembly 28, which functions as a bearing portion, comprises a pivot 23 standing on the bottom wall of the base 12 and a cylindrical hub rotatably supported on the pivot 23 by a pair of bearings. The head actuator 20 comprises four arms 22 mounted on the hub, four suspensions 30 extending individually from the arms, the magnetic heads 17 supported individually on respective extended ends of the suspensions 30, and spacer rings.

Each magnetic head 17 comprises a substantially rectangular slider (not shown) and recording/reproducing magnetoresistive (MR) head elements formed on the slider, and is fixed to a gimbal portion formed on the distal end portion of each suspension 30. Each head 17 is electrically connected to a main FPC 21b (mentioned later) through a relay flexible printed circuit board (relay FPC, not shown). Thus, each magnetic head 17 is electrically connected to the FPC unit 21 through the relay FPC and main FPC 21b.

The four arms 22 are located parallel to one another with predetermined spaces between them, and the suspensions 30 and magnetic heads 17 on these arms are opposed to one another. The VCM 24 comprises a support frame (not shown), which extends from the hub of the bearing assembly 28 in the direction opposite from the arms 27, and a voice coil supported by the support frame. When the head actuator 20 is incorporated in the base 12, the voice coil is located between a pair of yokes 62 fixed on the base 12. In conjunction with these yokes and a magnet (not shown) fixed to one of the yokes, the voice coil constitutes the VCM 24. If the voice coil is energized, the head actuator 20 rotates around the pivot 23 so that each magnetic head 17 is moved to and positioned in a region over a desired track of the magnetic disk 16.

The ramp load mechanism 25 comprises a ramp 64, which is disposed on the bottom wall of the base 12 and located outside the magnetic disks 16, and tabs extending individually from the respective distal ends of the suspensions 30. If the head actuator 20 is rotated so that each magnetic head 17 is moved to the retracted position outside each magnetic disk 16, each tab engages with a ramp surface formed on the ramp 64 and is then pulled up along the slope of the ramp surface, whereupon the head 17 is unloaded.

The FPC unit 21 comprises a main body 21a, which is formed of a flexible printed circuit board and fixed to the bottom wall of the base 12. Electronic components, such as a head amplifier, connectors, etc., are mounted on the main body 21a. An extended end of the main FPC 21b is electrically connected to each magnetic head 17 by the relay FPC.

The HDD comprises a circulation filter 66 and breathing filter 67. The circulation filter 66 is used to capture and remove contaminants, such as dust, moisture, and gas components, in the outdoor air that flows in through breathing holes formed in the top cover 14 or the bottom wall of the base 12. The breathing filter 67 serves to capture dust that is produced in the housing 10 as movable parts operate. These filters 66 and 67 are arranged around the magnetic disks 16.

Figure 2:
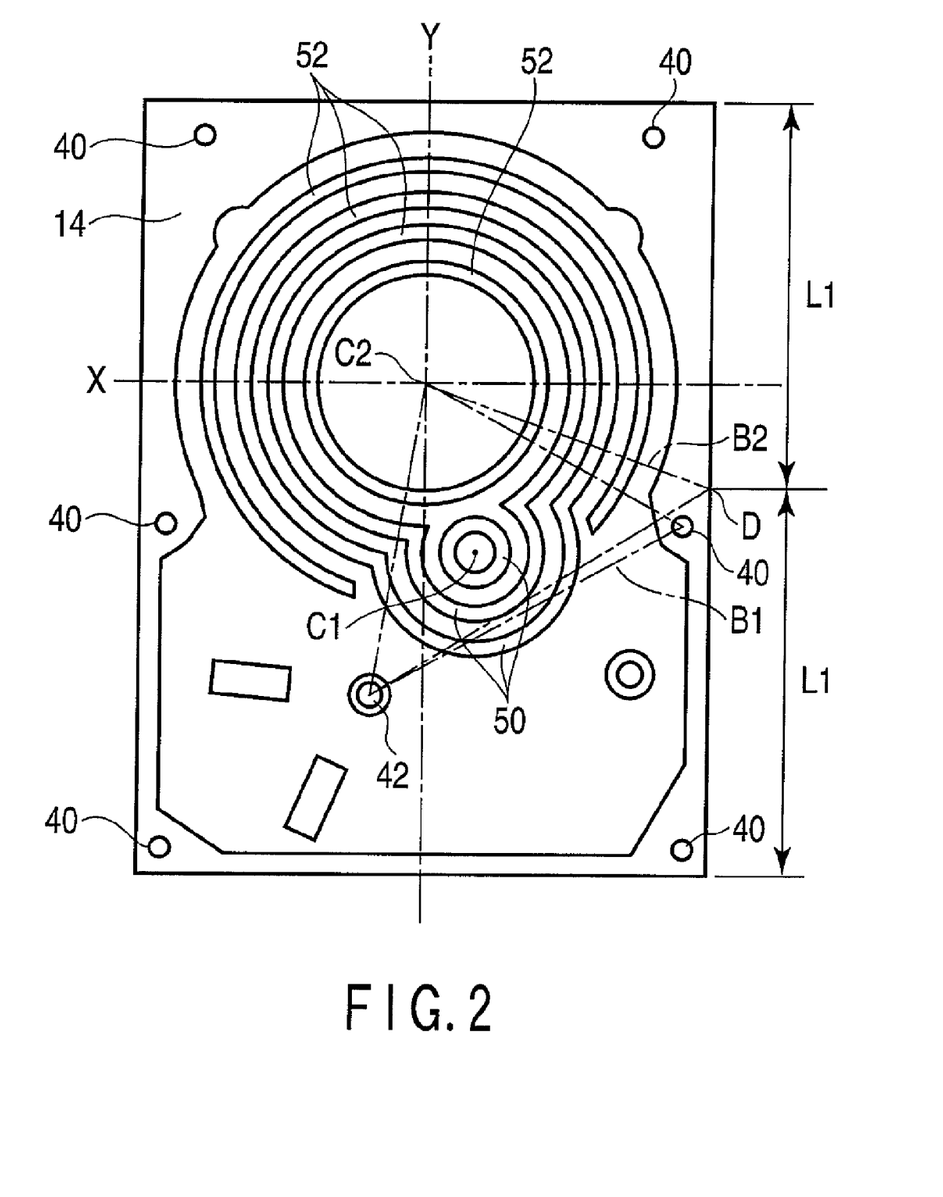
FIG. 2 is an exemplary plan view of a top cover of the HDD.

FIG. 2 is a plan view showing a configuration of the top cover of the HDD. As shown in FIGS. 1 and 2, the top cover 14 in the form of a rectangular plate is formed by pressing, for example, an aluminum alloy plate about 0.4 mm thick. First through-holes 40 are formed individually at four corner portions and substantially central parts of a pair of long side edges of the top cover 14. The top cover 14 is fastened to the base 12 by driving the screws 11 into threaded holes in the peripheral edge portion of the base 12 through the first through-holes 40, individually, thereby closing the top opening of the base. The top cover 14 is opposed parallel to the magnetic disks 16 with a predetermined space therebetween.

A second through-hole 42 is formed in that region of the top cover 14 which faces the pivot 23 of the bearing assembly 28. The pivot 23 and a part of the top cover 14 are fastened to each other as a fixing screw 13 passed through the second through-hole 42 is driven into the upper end portion of the pivot 23. Accordingly, the opposite end portions of the pivot 23 are supported individually by the base 12 and top cover 14 of the housing 10. Thus, the top cover 14 comprises the six first through-holes 40 for screw attachment on its peripheral edge portion and the second through-hole 42 for screw attachment on the pivot 23.

The top cover 14 is pressed so that its whole region except the peripheral edge portion forms an outward (or upward as in FIG. 1) projection. The six first through-holes 40 are individually formed in the peripheral edge portion of the top cover 14. In order to increase the rigidity of the top cover 14, moreover, a plurality of ribs (described in detail later) are formed on the top cover by drawing.

For the HDD comprising the top cover without the ribs (mentioned later), sound pressure levels were measured in a plurality of (e.g., 12) positions at a vertical distance of 1 cm from the surface of the top cover 14, with the spindle motor idling at, for example, 5,400 rpm.

Figure 3:
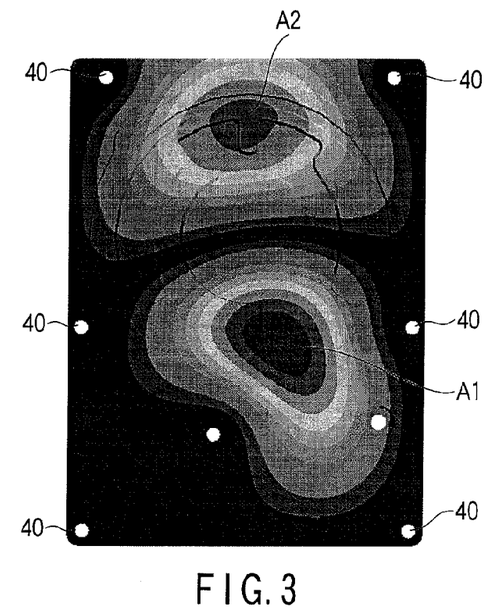
FIG. 3 is an exemplary diagram schematically showing a result of secondary vibration analysis on the top cover.

FIG. 3 shows a result of simulation analysis of the vibration mode of the top cover 14 based on the finite element method. In FIG. 3, a dark region (first region) A1 in the center of a striped gradation is a region where the secondary vibration amplitude of the top cover 14 is larger than other region and maximal, and the secondary natural frequency of this region is about 1.4 kHz. This result agrees with the aforementioned results of measurement on both the sound pressure peak frequency and the sound production position. Thus, it is believed that if the spindle motor rotates, vibration attributable to this motor rotation is transmitted to the top cover 14, so that the first region A1 vibrates like a drum and produces noise. Further, a region, where the primary vibration amplitude is larger than other region and maximal, is located substantially on a center C2 of rotation of the spindle motor 18.

In the present embodiment, therefore, a first rib of a shape having its center C1 in the first region A1 is formed on the top cover 14 by drawing, and a second rib for increasing the rigidity of a second region A2 is also formed by drawing. By doing this, vibration of the top cover can be suppressed to obtain a noise reduction effect.

More specifically, let it be supposed that, in the top cover 14, a first axis Y passes over the center C2 of rotation of the spindle motor 18 and extends longitudinally relative to the housing 10 and that a second axis X passes over the center C2 of rotation and extends at right angles to the first axis Y, as shown in FIG. 2. Thereupon, a triangular region B1, which has vertexes on the center C2 of rotation of the spindle motor 18, the center of the second through-hole 42, and that one of the first through-holes 40 which is located on the opposite side of the first axis Y from the second through-hole 42 and at the central part of one of the long side edges of the top cover 14, is substantially coincident with the region A1 where the secondary vibration amplitude is maximal. If the first through-hole 40 concerned is absent or deviates from the central part of the long side of the top cover 14, moreover, a triangular region B2, which has vertexes on the center C2 of rotation of the spindle motor 18, the center of the second through-hole 42, and a longitudinal center D of the long side on the opposite side of the first axis from the second through-hole, is substantially coincident with the region A1 where the secondary vibration amplitude is maximal.

First ribs 50 are formed on the top cover 14 by drawing. Each first rib 50 is shaped having a center C1 or area gravity center of the shape of a closed or open curve or polygon in the region B1 or B2. If the rib 50 is in the shape of an open curve or partially open polygon, it has a center-of-gravity area in a closed region that is defined by connecting the nearest end portions. In the present embodiment, the top cover 14 comprises a plurality of circular or arcuate first ribs 50 of different diameters that are concentric with respect to the center C1 in the region B1 or B2. The innermost first rib 50 is in the shape of a circle, a closed curve, while the two outer first ribs 50 are each in the shape of a circular arc. Although the illustrated first ribs 50 are equal in width, they may alternatively be formed to have different widths.

Each first rib 50 is not limited to the shape of a circle as a closed curve or a circular arc as an open curve, and may alternatively be in the shape of an ellipse or some other curved shape or the shape of an open curve that partially includes an elliptic or curved shape. Further, each first rib 50 may be in the shape of a closed or open curve that partially includes segments or inflection points. Furthermore, each first rib 50 may be in the shape of a polygon that is or is not closed.

As shown in FIGS. 1 and 2, the top cover 14 comprises second ribs 52 that serve to reduce the primary vibration amplitude of the top cover. The second ribs 52 are arranged around the center C2 of rotation of the spindle motor 18, which is located near the region where the primary vibration amplitude is maximal. In the present embodiment, the second ribs 52 are formed by drawing into circular arcs around the center C2 of rotation of the spindle motor 18. The top cover 14 comprises the second ribs 52 that are formed by drawing into concentric circular arcs of different diameters around the center C2 of rotation of the motor 18.

The innermost second rib 52 is in the shape of a circle, which is isolated from any of the first ribs 50. Two outer second ribs 52 are formed individually into circular arcs, which are continuous with their corresponding first ribs 50. Although the illustrated second ribs 52 are equal in width, they may alternatively be formed to have different widths. Further, each second rib 52, like each first rib 50, is not limited to the shape of a circular arc, and may alternatively be in the shape of a polygon or the like. Furthermore, the circular arc is not limited to the shape of a perfect circle, and may be in a shape that includes the shape of an ellipse or some other curved shape.

According to the HDD comprising the top cover 14 constructed in this manner, the top cover 14 is provided with the ribs having their center in the region where the secondary vibration amplitude is high. Thus, secondary vibration of the top cover 14 can be suppressed, so that noise attributable to the vibration of the top cover can be reduced. Since the second ribs are arranged on the top cover 14, moreover, primary vibration, as well as the secondary vibration, of the top cover can be suppressed, so that noise attributable to the vibration of the top cover can be further reduced.

Figure 4:
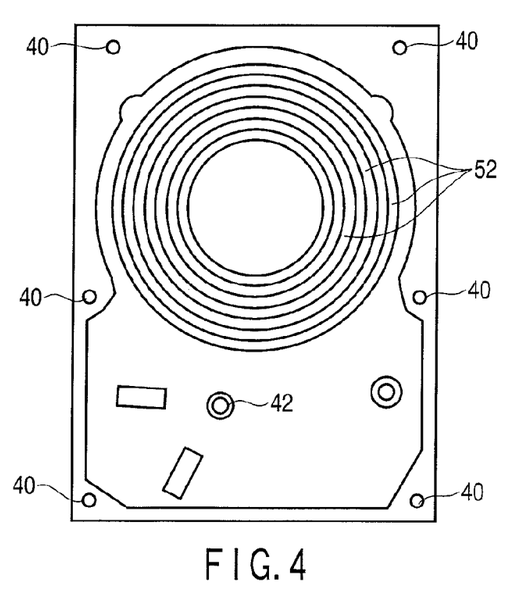
FIG. 4 is an exemplary plan view showing a top cover without first ribs according to a comparative example.
Figure 5:
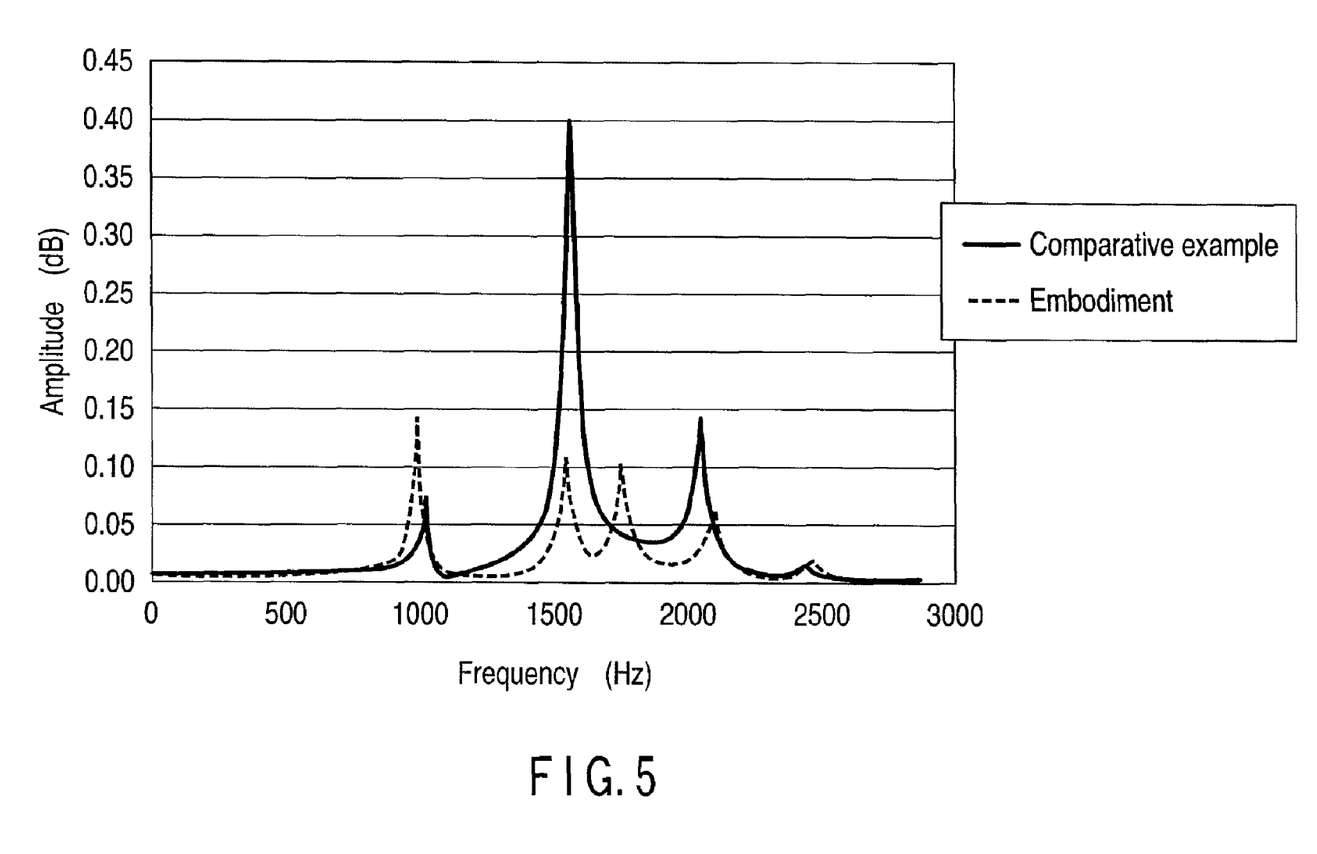
FIG. 5 is an exemplary diagram comparatively showing relationships between frequency and vibration for the top covers according to the first embodiment and comparative example.

FIG. 4 shows a top cover without first ribs according to a comparative example. FIG. 5 comparatively shows changes of vibration amplitude relative to frequency in the center C1 for the top cover 14 of the HDD according to the present embodiment and the top cover according to the comparative example. As seen from FIG. 5, the secondary vibration amplitude of the top cover of the HDD according to the present embodiment near 1,600 Hz is much lower than that of the comparative example. It is to be understood that this reduction of vibration produces a noise reduction effect.

The following is a description of top covers of HDDs according to alternative embodiments of the invention.

Figure 6:
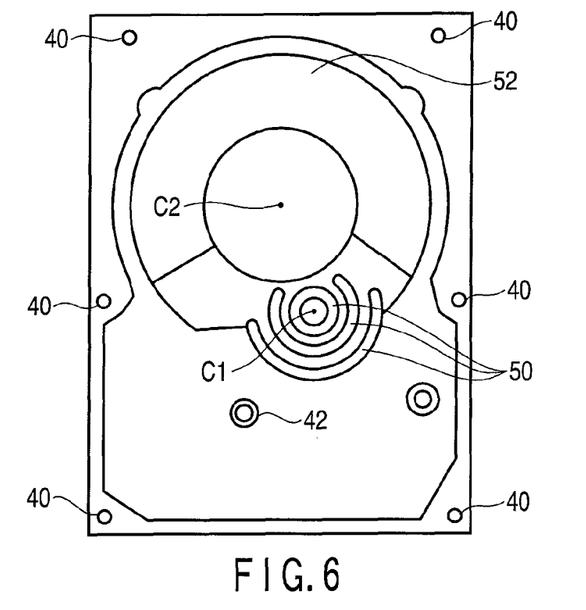
FIG. 6 is an exemplary plan view showing a top cover of an HDD according to a second embodiment.

FIG. 6 shows a top cover 14 of an HDD according to a second embodiment. In the second embodiment, the top cover 14 comprises a plurality of first ribs 50 and a single second rib 52 that are formed by drawing. The second rib 52 is in the shape of a circular arc or "C" concentric with a center C2 of rotation of a spindle motor. Further, the second rib 52 is wider than each first rib 50. The second rib 52 is formed so as to be convex on the upper side of the top cover 14 or on the lower side of the top cover, that is, on the magnetic-disk side.

Since other configurations of the HDD of the second embodiment are the same as those of the first embodiment, like reference numbers are used to designate like parts throughout the drawings, and a detailed description of those parts is omitted.

According to the second embodiment, the same functions and effects as those of the first embodiment can be obtained. Further, the first and second ribs 50 and 52 can be easily formed without interference between them.

The second rib 52 may be omitted if a satisfactory noise reduction effect can be obtained from the first ribs 50. In this case, the manufacturing cost of the top cover can be reduced.

Figure 7:
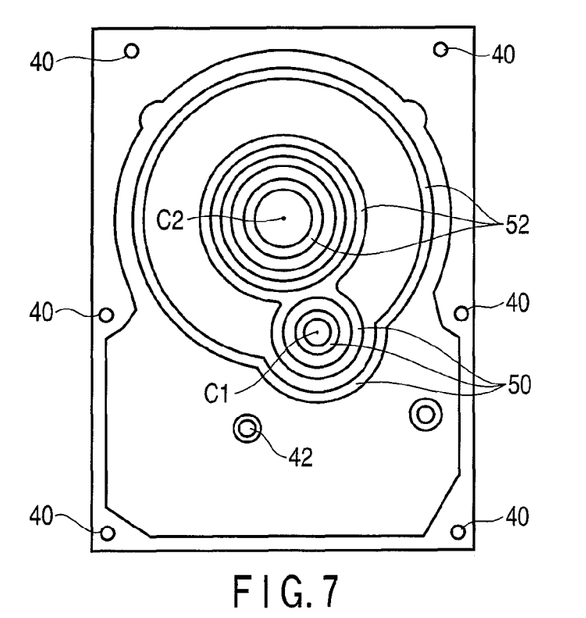
FIG. 7 is an exemplary plan view showing a top cover of an HDD according to a third embodiment.

In a top cover of an HDD according to a third embodiment shown in FIG. 7, a plurality of second ribs 52 of different diameters concentric with a center C2 of rotation of a spindle motor are formed opposite the central part of the spindle motor. According to this arrangement, the same functions and effects as those of the first embodiment can be obtained, and the depression resistance of the top cover 14 can be improved. Since the central part of the spindle motor corresponds to the antinode of the primary vibration mode of the top cover 14, moreover, an additional noise reduction effect can be obtained from the second ribs 52.

Since other configurations of the HDD of the third embodiment are the same as those of the first embodiment, like reference numbers are used to designate like parts throughout the drawings, and a detailed description of those parts is omitted.

Figure 8:
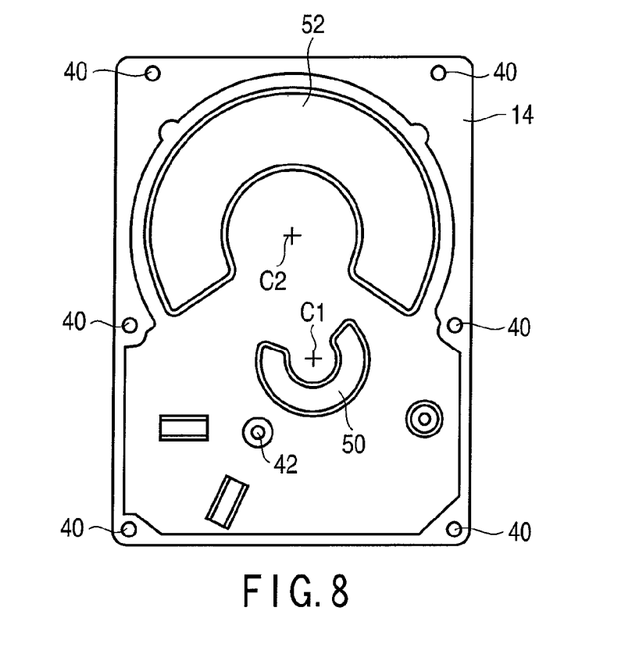
FIG. 8 is an exemplary plan view showing a top cover of an HDD according to a fourth embodiment.

FIG. 8 shows a top cover 14 of an HDD according to a fourth embodiment. In the fourth embodiment, the top cover 14 comprises a single arcuate first rib 50 and a single arcuate second rib 52 that are formed by drawing. The first rib 50 is in the shape of a circular arc or C around a center C1 in the aforementioned region B1 or B2.

The second rib 52 is in the shape of a circular arc or "C" concentric with a center C2 of rotation of a spindle motor. Further, the second rib 52 is wider than the first rib 50. The second rib 52 is formed so as to be convex on the upper side of the top cover 14 or on the lower side of the top cover, that is, on the magnetic-disk side.

Since other configurations of the HDD of the fourth embodiment are the same as those of the first embodiment, like reference numbers are used to designate like parts throughout the drawings, and a detailed description of those parts is omitted.

According to the fourth embodiment, the same functions and effects as those of the first embodiment can be obtained. Further, the first and second ribs 50 and 52 can be easily formed without interference between them. The second rib 52 may be omitted if a satisfactory noise reduction effect can be obtained from the first rib 50.

The first rib 50 is not limited to the shape of a closed or open curve or circular arc, and may alternatively be in the shape of a polygon or partially discontinued polygon. In an HDD according to a fifth embodiment shown in FIG. 9, a top cover 14 comprises a plurality of first ribs 50 and a single arcuate second rib 52 that are formed by drawing. The first ribs 50 are triangular structures that have a common center C1 or center-of-gravity area in the aforementioned region B1 or B2. The outer first rib 50 is not perfectly triangular and is open at one vertex portion.

Figure 9:
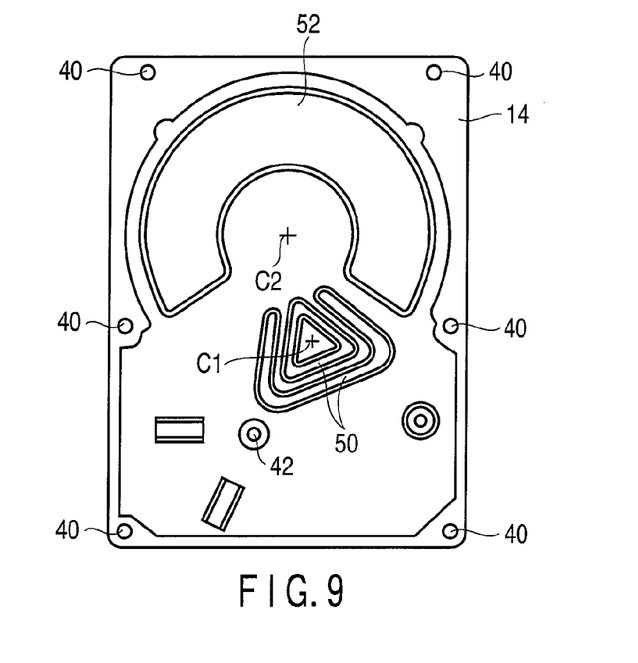
FIG. 9 is an exemplary plan view showing a top cover of an HDD according to a fifth embodiment.

The second rib 52 is in the shape of a circular arc or C concentric with a center C2 of rotation of a spindle motor.

Since other configurations of the HDD of the fifth embodiment are the same as those of the first embodiment, like reference numbers are used to designate like parts throughout the drawings, and a detailed description of those parts is omitted. The same functions and effects as those of the first embodiment can also be obtained from the fifth embodiment.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the shapes and numbers of first and second ribs formed on the top cover are not limited to those of the embodiments described herein and may be changed as required. This invention is not limited to 2.5-inch HDDs and can also be applied to 3.5- or 1.8-inch HDDs or the like. Further, the number of magnetic disks to be mounted in the disk drive is not limited to two and may alternatively be one or three or more. The materials of the top cover and other constituent elements are not limited to the embodiments described herein and may be changed if necessary.

What is claimed is:

1. A disk drive comprising:
    a housing comprising a base and a top cover combined to the base, and containing therein a motor configured to rotate about a rotational center and a pivot as a rotational center of a head actuator,
    wherein the top cover comprises a first rib, the first rib configured in a shape comprising a first center in a triangular region, the triangular region comprising vertexes on
    a first point corresponding to the rotational center of the motor,
    a second point corresponding to the pivot, and
    a third point at a central portion of one side on an opposite side of the second point with respect to an axis extending longitudinally relative to the housing through the first point.

2. The disk drive of claim 1, wherein the top cover comprises at least one first through-hole where a screw through the first through-hole is configured to fasten the top cover and the base to each other, and a second through-hole facing the pivot where a screw through the second through-hole is configured to fasten the top cover to the pivot, and the second point of the triangular region is a center of the second through-hole.

3. The disk drive of claim 2, wherein the third point of the triangular region is the first through-hole at a central portion of a long side edge of the top cover.

4. The disk drive of claim 1, wherein the first rib is in a circular arc comprising a center in the triangular region.

5. The disk drive of claim 1, wherein the top cover comprises a plurality of first ribs of different diameters, the plurality of first ribs are individually formed into concentric shapes comprising the first center in the triangular region.

6. The disk drive of claim 1, wherein the first center of the first rib is in a first region where secondary vibration of the top cover is larger than secondary vibration outside of the first region.

7. The disk drive of claim 1, wherein the top cover comprises an arcuate second rib comprising a second center different from the first center.

8. The disk drive of claim 7, wherein the second rib is in an arcuate comprising the second center on a center of rotation of the recording medium.

9. The disk drive of claim 7, wherein the second rib is in a second region where primary vibration of the top cover is larger than primary vibration outside of the second region.

* * * * *